(12) United States Patent
Van Hamersveld

(10) Patent No.: US 10,194,382 B2
(45) Date of Patent: Jan. 29, 2019

(54) AUTO-DISCOVERY OF AMENITIES

(71) Applicant: BandwidthX Inc., Carlsbad, CA (US)

(72) Inventor: Chris Van Hamersveld, San Marcos, CA (US)

(73) Assignee: BandwidthX Inc., Carlsbad, CA (US)

(*) Notice: Subject to any disclaimer, the term of this patent is extended or adjusted under 35 U.S.C. 154(b) by 0 days.

(21) Appl. No.: 15/847,496

(22) Filed: Dec. 19, 2017

(65) Prior Publication Data

US 2018/0184363 A1 Jun. 28, 2018

Related U.S. Application Data

(60) Provisional application No. 62/439,406, filed on Dec. 27, 2016.

(51) Int. Cl.
*H04W 4/00* (2018.01)
*H04W 48/16* (2009.01)
*H04W 48/20* (2009.01)

(52) U.S. Cl.
CPC ........... *H04W 48/16* (2013.01); *H04W 48/20* (2013.01)

(58) Field of Classification Search
CPC ..... H04W 36/32; H04W 40/00; H04W 40/28; H04W 48/16; H04W 4/02; H04W 4/023; H04W 52/00; H04W 52/0235; H04W 64/00; H04W 64/003; H04W 88/18
See application file for complete search history.

(56) References Cited

U.S. PATENT DOCUMENTS

| 6,870,822 | B2 | 3/2005 | Balogh |
| 7,003,311 | B2 | 2/2006 | Ebata et al. |
| 7,505,795 | B1 | 3/2009 | Lim et al. |
| 7,808,960 | B1 | 10/2010 | Chan et al. |
| 8,036,367 | B2 | 10/2011 | Baluja et al. |
| 8,116,285 | B1 | 2/2012 | Barnum |
| 8,228,861 | B1 | 7/2012 | Nix |
| 8,494,559 | B1 | 7/2013 | Malmi |
| 8,711,866 | B2 * | 4/2014 | Shmueli ................. H04L 65/60 370/271 |
| 9,084,179 | B2 | 7/2015 | Visuri et al. |

(Continued)

FOREIGN PATENT DOCUMENTS

| CN | 1535045 A | 10/2004 |
| CN | 101616452 A | 12/2009 |

(Continued)

OTHER PUBLICATIONS

International Search Report and Written Opinion for related international application No. PCT/US2017/067378, dated Apr. 13, 2018.

(Continued)

*Primary Examiner* — Jean A Gelin
(74) *Attorney, Agent, or Firm* — Procopio, Cory, Hargreaves & Savitch LLP

(57) ABSTRACT

Automated discovery of amenities. In an embodiment, when a mobile device is inactive, the mobile device is used to automatically scan an environment, using a radio system, in order to identify one or more access points within the environment. The one or more access points are then automatically scouted by attempting to connect to and traverse each access point, to determine and record a status of each access point.

18 Claims, 3 Drawing Sheets

(56) References Cited

U.S. PATENT DOCUMENTS

| | | |
|---|---|---|
| 9,497,680 B1 | 11/2016 | Tran et al. |
| 2002/0181417 A1 | 12/2002 | Malhotra et al. |
| 2003/0003868 A1 | 1/2003 | Juurikko |
| 2003/0179135 A1 | 9/2003 | Louhi |
| 2003/0182556 A1 | 9/2003 | Sunder et al. |
| 2003/0232615 A1 | 12/2003 | Kim et al. |
| 2004/0156372 A1 | 8/2004 | Hussa |
| 2004/0202141 A1 | 10/2004 | Sinivaara et al. |
| 2004/0224665 A1 | 11/2004 | Kokubo |
| 2004/0255008 A1 | 12/2004 | Olsen et al. |
| 2005/0055371 A1 | 3/2005 | Sunder et al. |
| 2005/0153692 A1 | 7/2005 | Hwang et al. |
| 2005/0255865 A1 | 11/2005 | Sillasto et al. |
| 2005/0271021 A1 | 12/2005 | Alemany et al. |
| 2006/0002342 A1 | 1/2006 | Lin |
| 2006/0072493 A1 | 4/2006 | Ginzburg et al. |
| 2006/0104205 A1* | 5/2006 | Strutt ............... H04L 45/02 370/238 |
| 2006/0166669 A1 | 7/2006 | Claussen |
| 2007/0030857 A1* | 2/2007 | Fulknier ............ H04L 45/00 370/401 |
| 2007/0140157 A1 | 6/2007 | Fu et al. |
| 2007/0165593 A1 | 7/2007 | Hundal et al. |
| 2007/0171881 A1* | 7/2007 | Zhang ............... H04W 48/16 370/338 |
| 2007/0185804 A1 | 8/2007 | Cordoba |
| 2007/0213101 A1 | 9/2007 | Oh et al. |
| 2007/0249291 A1 | 10/2007 | Nanda et al. |
| 2008/0057956 A1 | 3/2008 | Black et al. |
| 2008/0075051 A1 | 3/2008 | Dundar et al. |
| 2008/0137622 A1 | 6/2008 | Russell |
| 2008/0176571 A1 | 7/2008 | Choi |
| 2008/0293404 A1 | 11/2008 | Scherzer et al. |
| 2009/0003242 A1 | 1/2009 | Tinnakornsrisuphap et al. |
| 2009/0028120 A1 | 1/2009 | Lee |
| 2009/0098869 A1 | 4/2009 | Torrance et al. |
| 2009/0180451 A1 | 7/2009 | Alpert et al. |
| 2009/0203352 A1 | 8/2009 | Fordon et al. |
| 2009/0239574 A1 | 9/2009 | Hussain |
| 2010/0085938 A1 | 4/2010 | Chen et al. |
| 2010/0091669 A1 | 4/2010 | Liu et al. |
| 2010/0103844 A1 | 4/2010 | Kim |
| 2010/0177673 A1 | 7/2010 | Yoon |
| 2010/0195632 A1 | 8/2010 | Prabhu |
| 2010/0202323 A1 | 8/2010 | Nishida et al. |
| 2010/0226299 A1 | 9/2010 | Sumida et al. |
| 2010/0240352 A1 | 9/2010 | Suri et al. |
| 2010/0296441 A1 | 11/2010 | Barkan |
| 2011/0060839 A1 | 3/2011 | Ohta et al. |
| 2011/0088080 A1 | 4/2011 | Stupar et al. |
| 2011/0111708 A1 | 5/2011 | Tu et al. |
| 2011/0158143 A1 | 6/2011 | Yun et al. |
| 2011/0171909 A1 | 7/2011 | Jung et al. |
| 2011/0194532 A1 | 8/2011 | Kakkad |
| 2011/0246281 A1 | 10/2011 | Satyavolu et al. |
| 2011/0263214 A1 | 10/2011 | Robinson et al. |
| 2011/0286437 A1 | 11/2011 | Austin et al. |
| 2011/0294539 A1 | 12/2011 | Shin et al. |
| 2011/0310840 A1 | 12/2011 | Kennedy et al. |
| 2011/0320588 A1 | 12/2011 | Raleigh |
| 2012/0026992 A1 | 2/2012 | Navda et al. |
| 2012/0047269 A1 | 2/2012 | Leonov et al. |
| 2012/0099495 A1* | 4/2012 | Mitra ............... H04W 52/0235 370/311 |
| 2012/0140651 A1 | 6/2012 | Nicoara et al. |
| 2012/0157156 A1 | 6/2012 | Han et al. |
| 2012/0170513 A1 | 7/2012 | Vogedes et al. |
| 2012/0170556 A1 | 7/2012 | Tsfati et al. |
| 2012/0176929 A1 | 7/2012 | Choi |
| 2012/0230193 A1 | 9/2012 | Fang |
| 2012/0257558 A1 | 10/2012 | Shin et al. |
| 2012/0258726 A1 | 10/2012 | Bansal et al. |
| 2012/0270538 A1 | 10/2012 | Meylan et al. |
| 2013/0022024 A1 | 1/2013 | Chu et al. |
| 2013/0090115 A1 | 4/2013 | Deivasigamani et al. |
| 2013/0100928 A1 | 4/2013 | Matsumori et al. |
| 2013/0100944 A1 | 4/2013 | Kwon et al. |
| 2013/0262850 A1 | 10/2013 | Canpolat et al. |
| 2013/0272285 A1 | 10/2013 | Goldsmith et al. |
| 2013/0281154 A1 | 10/2013 | Aerrabotu |
| 2013/0322316 A1 | 12/2013 | Hara et al. |
| 2014/0026192 A1 | 1/2014 | Gatewood et al. |
| 2014/0113628 A1 | 4/2014 | Sundararajan et al. |
| 2014/0129385 A1 | 5/2014 | Anderson et al. |
| 2014/0133297 A1 | 5/2014 | Raleigh et al. |
| 2014/0220967 A1 | 8/2014 | Pankajakshan et al. |
| 2014/0274035 A1 | 9/2014 | Unger et al. |
| 2014/0286326 A1* | 9/2014 | Jang ................ H04W 4/02 370/338 |
| 2014/0287775 A1* | 9/2014 | Kawai ............... H04W 64/00 455/456.1 |
| 2015/0103177 A1* | 4/2015 | Slamka ............. H04N 7/185 348/158 |
| 2015/0257038 A1 | 9/2015 | Scherzer |
| 2016/0037298 A1 | 2/2016 | Park et al. |
| 2016/0119850 A1 | 4/2016 | Kimura et al. |
| 2016/0127152 A1 | 5/2016 | Balwani |
| 2016/0183058 A1 | 6/2016 | Nicosa |
| 2016/0227591 A1 | 8/2016 | Oh et al. |
| 2016/0262201 A1 | 9/2016 | Visuri et al. |
| 2016/0302035 A1 | 10/2016 | Kiskani et al. |

FOREIGN PATENT DOCUMENTS

| | | |
|---|---|---|
| CN | 101616463 A | 12/2009 |
| CN | 101715228 A | 5/2010 |
| CN | 102685750 A | 9/2012 |
| CN | 102932771 A | 2/2013 |
| CN | 103402190 A | 11/2013 |
| EP | 1926283 A1 | 5/2008 |
| EP | 2170003 A2 | 3/2010 |
| EP | 2341738 A1 | 7/2011 |
| EP | 2421331 A1 | 2/2012 |
| KR | 1020040025222 A | 3/2004 |
| KR | 1020110045885 A | 5/2011 |
| WO | 2006126062 A2 | 11/2006 |
| WO | 2009157171 A1 | 12/2009 |
| WO | 2013184110 A1 | 12/2013 |
| WO | 2014022069 A1 | 2/2014 |

OTHER PUBLICATIONS

International Search Report and Written Opinion for related international application No. PCT/US2017/066965, dated Apr. 16, 2018.
International Search Report and Written Opinion for related international application No. PCT/US2017/067522, dated Apr. 16, 2018.
International Search Report and Written Opinion for related international application No. PCT/US2017/067523, dated Apr. 16, 2018.
International Search Report and Written Opinion for related international application No. PCT/US2017/067524, dated Apr. 12, 2018.
Extended European Search Report for related EP Patent Application No. 12851159.9, dated Jul. 14, 2015.
Extended European Search Report for related EP Patent Application No. 14773816.5, dated Oct. 24, 2016.
Extended European Search Report for related EP Patent Application No. 16187937.4, dated Nov. 14, 2016.
International Search Report and Written Opinion for related international application No. PCT/US2012/066389, dated Mar. 18, 2013.
International Search Report and Written Opinion for related international application No. PCT/US2014/031912, dated Jul. 31, 2014.
Office Action and Search Report dated May 3, 2017 for related CN Patent Application No. 2012800579653.
Office Action and Search Report dated May 3, 2018 for related CN Patent Application No. 201480028997X in 9 pages.
Extended European Search Report for related EP Patent Application No. 18151712.9, dated Jul. 5, 2018, in 10 pages.

* cited by examiner

US 10,194,382 B2

AUTO-DISCOVERY OF AMENITIES

CROSS-REFERENCE TO RELATED APPLICATIONS

The present application claims priority to U.S. Provisional Patent App. No. 62/439,406, filed on Dec. 27, 2016, which is hereby incorporated herein by reference as if set forth in full.

BACKGROUND

Field of the Invention

The embodiments described herein are generally directed to the automated discovery of amenities (e.g., hotspots) by a mobile device.

Description of the Related Art

In mobile devices with multiple radio systems (e.g., a cellular radio system and a Wi-Fi™ radio system), there is currently a need to manage the secondary radio system (e.g., the Wi-Fi™ system) to find as many offload opportunities as possible, without requiring excessive data downloads or excessive manual work to curate local, single-location amenity hotspots (e.g., provided by a local restaurant or boutique). In addition, a balance must be struck between the benefits of additional offload of traffic from a cellular network to a Wi-Fi™ network and the risk of the mobile device connecting to a nefarious hotspot that places the user's data at risk.

SUMMARY

Accordingly, systems, methods, and media are disclosed for automated discovery of amenities with one or more controls to strike an appropriate balance between the tradeoffs discussed above.

In an embodiment, a method for a mobile device comprising a first radio system and a second radio system is disclosed. The method comprises using at least one hardware processor of the mobile device to: determine whether or not the mobile device is inactive; and, when the mobile device is determined to be inactive, scan an environment of the mobile device using the second radio system to identify one or more access points, attempt to connect to an access point, and, when a connection to the access point is established, determining whether or not a captive portal is encountered while attempting to connect to the Internet via the access point.

In an embodiment, a method for a mobile device comprising a first radio system and a second radio system is disclosed. The method comprises using at least one hardware processor of the mobile device to: determine whether or not the mobile device is inactive; and, when the mobile device is determined to be inactive, over a time period during which the mobile device is inactive, scouting one or more access points by scanning an environment of the mobile device using the second radio system to identify one or more access points, and, for each of the one or more identified access points, attempting to connect to the access point, when a connection to the access point cannot be established, setting a scouting status to indicate a failure to establish a connection, when a connection to the access point is established, attempting to connect to the Internet via the access point, determining whether or not a captive portal is encountered while attempting to connect to the Internet via the access point, when no captive portal is encountered and a connection to the Internet via the access point is established, setting the scouting status to indicate that no captive portal was encountered, and, when a captive portal is encountered while attempting to connect to the Internet via the access point, attempting to traverse the captive portal using a set of instructions, when the captive portal cannot be traversed, setting the scouting status to indicate that the captive portal could not be traversed, and, when the captive portal is traversed, setting the scouting status to indicate that the captive portal was traversed, and, recording an identifier of the access point in association with the scouting status.

Any of the methods may be embodied in executable software modules of a processor-based system, such as a mobile device, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for automated discovery of amenities. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview 1.1. Infrastructure

Figure 1:
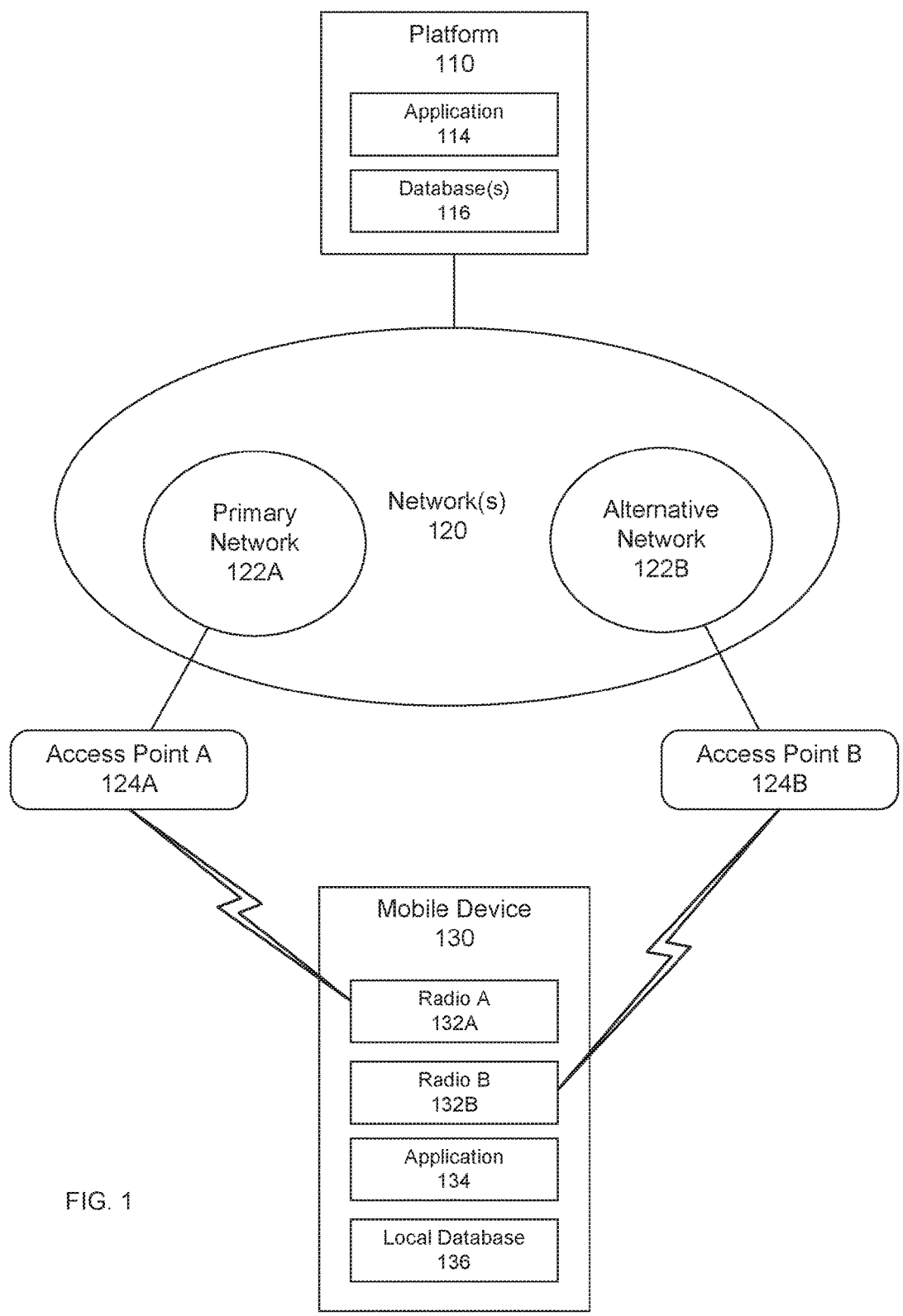
FIG. 1 illustrates an example infrastructure, in which one or more of the processes described herein, may be implemented, according to an embodiment.

FIG. 1 illustrates an example system in which automated discovery of amenities may occur, according to an embodiment. The infrastructure may comprise a platform 110 (e.g., one or more servers) which hosts and/or executes one or more of the various functions, processes, methods, and/or software modules described herein. Platform 110 may comprise or be communicatively connected to a server application 114 and/or one or more databases 116. Platform 110 may comprise dedicated servers, or, alternatively, cloud instances which utilize shared resources of one or more servers. Platform 110 may comprise collocated and/or distributed servers or cloud instances. While only one server application 114 and one set of database(s) 116 are illustrated, it should be understood that the infrastructure may comprise any number of server applications and databases. Platform 110 may be communicatively connected to one or more mobile devices 130 via one or more networks 120.

Network(s) 120 may comprise the Internet, wireless communication networks, local home networks, any other network, and/or any combination of networks. As illustrated, network(s) 120 comprise or are communicatively connected to a primary network 122A and an alternative network 122B. In an embodiment, each of primary network 122A and alternative network 122B comprises a wireless communication network which communicates with a radio of mobile device(s) 130 via a wireless communication protocol. For example, primary network 122A may comprise a cellular network which utilizes 2G (e.g., GSM, GPRS, EDGE, iDEN, TDMA, CDMA), 3G (e.g., CDMA2000, 1x-EVDO, WCDMA, UMTS, HSPA), 4G (e.g., LTE, LTE-A), 5G, etc., whereas alternative network 122B may comprise a Wi-Fi™ network (e.g., one or more of the family of 802.11 standards from The Institute of Electrical and Electronic Engineers (IEEE)).

Mobile device(s) 130 may comprise any type or types of computing devices capable of wireless communication, including without limitation, desktop computers, laptop computers, tablet computers, smart phones or other mobile phones, servers, game consoles, televisions, set-top boxes, electronic kiosks, point-of-sale terminals, Automated Teller Machines, and the like. In an embodiment, each mobile device 130 comprises a first radio system 132A, a second radio system 132B, a client application 134, and a local database 136. Mobile device 130 may be configured to turn on or off one or both of the first and second radio systems 132A and 132B independently of each other. First radio system 132A uses a first wireless communication protocol (e.g., a protocol used for a cellular network) to wirelessly connect to an access point 124A (e.g., a cellular base station serving a sector of a cellular network), which provides access to primary network 122A. Second radio system 132B uses a second wireless communication protocol (e.g., Wi-Fi™) to wirelessly connect to an access point 124B (e.g., a Wi-Fi™ access point), which provides access to alternative network 122B. It should be understood that the first wireless communication protocol may be different from the second wireless communication protocol.

As used herein, the term "application" may refer to any executable software module or library of software modules that exists on platform 110 (e.g., as server application 114), mobile device 130 (e.g., as client application 134), or both platform 110 and mobile device 130 (e.g., with some functions executed, as modules of server application 114, on platform 110, and some functions executed, as modules of client application 134, on mobile device 130).

Any of the software modules or other components described herein may take a variety of forms. For example, a component may be a stand-alone software package, or it may be a software package incorporated as a "tool" in a larger software product. It may be downloadable from a network (e.g., from a website) as a stand-alone product or as an add-in package for installation in an existing software application or operating system. It may also be available as a client-server software application, as a web-enabled software application, and/or as a mobile application.

1.2. Example Processing Device

Figure 2:
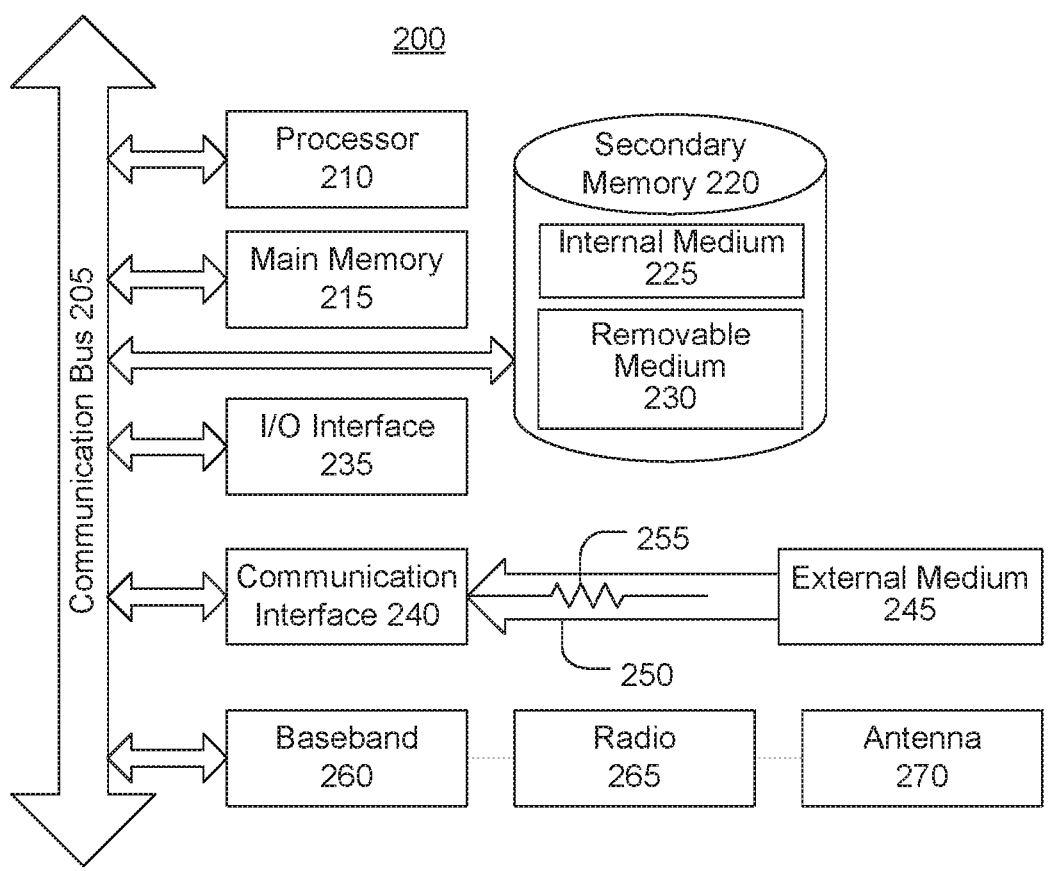
FIG. 2 illustrates an example processing system, by which one or more of the processed described herein, may be executed, according to an embodiment.

FIG. 2 is a block diagram illustrating an example wired or wireless system 200 that may be used in connection with various embodiments described herein. For example system 200 may be used as or in conjunction with one or more of the mechanisms, processes, methods, or functions (e.g., to store and/or execute the application or one or more software modules of the application) described herein, and may represent components of platform 110, mobile device(s) 130, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors, such as processor 210. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 210. Examples of processors which may be used with system 200 include, without limitation, the Pentium® processor, Core i7® processor, and Xeon® processor, all of which are available from Intel Corporation of Santa Clara, Calif.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, or standards promulgated by the Institute of Electrical and Electronics Engineers (IEEE) including IEEE 488 general-purpose interface bus (GPIB), IEEE 696/S-100, and the like.

System 200 preferably includes a main memory 215 and may also include a secondary memory 220. Main memory 215 provides storage of instructions and data for programs executing on processor 210, such as one or more of the functions and/or modules discussed above. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal memory 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, etc.

Removable storage medium 230 is a non-transitory computer-readable medium having stored thereon computer-executable code (e.g., disclosed software modules) and/or data. The computer software or data stored on removable storage medium 230 is read into system 200 for execution by processor 210.

In alternative embodiments, secondary memory 220 may include other similar means for allowing computer programs or other data or instructions to be loaded into system 200. Such means may include, for example, an external storage medium 245 and a communication interface 240, which allows software and data to be transferred from external storage medium 245 to system 200. Examples of external storage medium 245 may include an external hard disk drive, an external optical drive, an external magneto-optical drive, etc. Other examples of secondary memory 220 may include semiconductor-based memory such as programmable read-only memory (PROM), erasable programmable read-only memory (EPROM), electrically erasable read-only memory (EEPROM), or flash memory (block-oriented memory similar to EEPROM).

As mentioned above, system 200 may include a communication interface 240. Communication interface 240 allows software and data to be transferred between system 200 and external devices (e.g. printers), networks, or other information sources. For example, computer software or executable code may be transferred to system 200 from a network server via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a network interface card (NIC), a wireless data card, a communications port, an infrared interface, an IEEE 1394 fire-wire, or any other device capable of interfacing system 200 with a network or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network, or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (i.e., computer programs, such as the disclosed application, or software modules) is stored in main memory 215 and/or the secondary memory 220. Computer programs can also be received via communication interface 240 and stored in main memory 215 and/or secondary memory 220. Such computer programs, when executed, enable system 200 to perform the various functions of the disclosed embodiments as described elsewhere herein.

In this description, the term "computer-readable medium" is used to refer to any non-transitory computer-readable storage media used to provide computer-executable code (e.g., software and computer programs) to system 200. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable mediums are means for providing executable code, programming instructions, and software to system 200.

In an embodiment that is implemented using software, the software may be stored on a computer-readable medium and loaded into system 200 by way of removable medium 230, I/O interface 235, or communication interface 240. In such an embodiment, the software is loaded into system 200 in the form of electrical communication signals 255. The software, when executed by processor 210, preferably causes processor 210 to perform the features and functions described elsewhere herein.

In an embodiment, I/O interface 235 provides an interface between one or more components of system 200 and one or more input and/or output devices. Example input devices include, without limitation, keyboards, touch screens or other touch-sensitive devices, biometric sensing devices, computer mice, trackballs, pen-based pointing devices, and the like. Examples of output devices include, without limitation, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and the like.

System 200 may also include optional wireless communication components that facilitate wireless communication over a voice network and/or a data network. The wireless communication components comprise an antenna system 270, a radio system 265, and a baseband system 260. In system 200, radio frequency (RF) signals are transmitted and received over the air by antenna system 270 under the management of radio system 265.

In one embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also codes the digital signals for transmission and generates a baseband transmit audio signal that is routed to the modulator portion of radio system 265.

The modulator mixes the baseband transmit audio signal with an RF carrier signal generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as the disclosed application, or software modules) that can be stored in main memory 215 or secondary memory 220. Computer programs can also be received from baseband processor 260 and stored in main memory 210 or in secondary memory 220, or executed upon receipt. Such computer programs, when executed, enable system 200 to perform the various functions of the disclosed embodiments. For example, data storage areas 215 or 220 may include various software modules.

2. Process Overview

Embodiments of processes for automated discovery of amenities will now be described in detail. It should be understood that the described processes may be embodied in one or more software modules that are executed by one or more hardware processors, e.g., as the application discussed above (e.g., server application 112, client application 134, and/or a distributed application comprising both server application 112 and client application 134), which may be executed wholly by processor(s) of platform 110, wholly by processor(s) of mobile device(s) 130, or may be distributed across platform 110 and mobile device(s) 130 such that some portions or modules of the application are executed by platform 110 and other portions or modules of the application are executed by mobile device(s) 130. The described process may be implemented as instructions represented in source code, object code, and/or machine code. These instructions may be executed directly by the hardware processor(s), or alternatively, may be executed by a virtual machine operating between the object code and the hardware processors. In addition, the disclosed application may be built upon or interfaced with one or more existing systems.

In an embodiment, any set of one or more of the processes described herein may be implemented as a pluggable library that any host application can "plug in" to gain the benefits of those processes. Preferably, the effort required to "plug in" the library is minimal, for example, a few lines of code in the host application to initialize the library and turn it on to begin managing second radio system 132B (e.g., Wi-Fi™ radio system). In addition, the library may be provided with an application programming interface (API) that comprises a number of methods for the host application to use to gain greater control over the functions of the library. For example, the API may provide a method that allows the host application to extract a list of hotspot locations, so that the host application can display a map of the available hotspot locations.

As an alternative, various embodiments of the disclosed processes may be implemented primarily in hardware using, for example, components such as application specific integrated circuits (ASICs), or field programmable gate arrays (FPGAs). Implementation of a hardware state machine capable of performing the functions described herein will also be apparent to those skilled in the relevant art. Various embodiments may also be implemented using a combination of both hardware and software.

In other words, those of skill in the art will appreciate that the various illustrative logical blocks, modules, circuits, and method steps described herein, and the embodiments disclosed herein can often be implemented as electronic hardware, computer software, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit, or step is for ease of description. Specific functions or steps can be moved from one module, block, or circuit to another without departing from the invention.

In many mobile devices, it is customary to have the cellular radio system (e.g., first radio system 132A) on all the time. The cellular radio system handles communications with the mobile service provider, including voice calls and/or text messages. If there are no connections available via other radio connections, the cellular radio system may also handle any data communication that the mobile device may require. However, in many mobile devices, the data communication is automatically switched over to the Wi-Fi™ radio system (e.g., second radio system 132B) when a connection to the Internet or other backend system or network is available through the Wi-Fi™ radio system. This is because, in most cases, it is less costly and uses less battery power to send data communications over the Wi-Fi™ radio system. Some mobile devices may be equipped with a Wi-Fi™ radio system that is able to communicate with two or more access points (e.g., using different Wi-Fi™ protocols).

The mobile device (e.g., via application 134) may turn on the Wi-Fi™ radio system only in certain circumstances, for example, when a Wi-Fi™ access point is likely to be available. When the Wi-Fi™ radio system is turned on, it will scan the environment to see what, if any, Wi-Fi™ access points are reachable within the environment, and whether or not those Wi-Fi™ access points require a password or other credentials to establish a connection. If there is an access point available to the mobile device, the mobile device will connect to it, for example, to offload at least some wireless services (e.g., data communications, Short Message Service (SMS) communications, and/or voice communications) from the cellular network (e.g., primary network 122A) to the Wi-Fi™ network (e.g., alternative network 122B).

Examples of such radio management and/or alternative network access markets, in which such radio management is performed, may be found, for example, in U.S. Patent Pub. Nos. 2013/0322329, 2013/0322400, 2013/0322401, 2014/0293829, 2015/0189569, 2015/0189580, 2015/0189098, 2015/0282240, 2016/0192289, and 2016/0262201, the entireties of all of which are hereby incorporated herein by reference as if set forth in full. In embodiments of the alternative network access markets described in these references, a whitelist of hotspots (e.g., access points 124B) for alternative network 122B may be manually curated via server application 114 on platform 110.

In order to increase the available supply of amenity hotspots, beyond a manually-curated whitelist, an embodiment of client application 134 may be enabled to automatically discover, evaluate, and approve additional amenity hotspots on its own. Client application 134 may be configured to discover any open hotspot and/or only those hotspots which conform to specific guidelines. This enables the application to be configured with a level of aggressiveness based on a level of risk that a mobile network operator (MNO) or user deems acceptable.

2.1. Scouting Process

In an embodiment, the application performs scans using second radio system 132B to identify guest networks. In addition, the application may perform automatic analysis of guest networks, identified in the scans, to determine, for example, whether the guest network has a captive portal and/or access to the Internet. A captive portal typically takes the form of a special web page that prompts a user for login credentials, and which only provides Internet access (or other services) via the guest network if proper credentials are provided and verified. This conditional access is normally implemented by intercepting most packets transmitted by second radio system 132B until a user of mobile device 130 opens a browser and attempts to access the web.

In an embodiment, the application uses second radio system 132B to scout available guest networks, hotspots, or other amenities (collectively referred to herein as "hotspot" or "hotspots"). Specifically, the application may control second radio system 132B to perform a scan of the environment to identify visible hotspots. The application may then control second radio system 132B to attempt to connect to each identified hotspot, or those identified hotspots which have not been previously scouted. In attempting to connect to a hotspot, mobile device 130 may perform its normal start-up features, including connecting to the hotspot and attempting to verify and sign into the hotspot.

In an embodiment, since each connection attempt may result in failure, the application only scouts hotspots when mobile device 130 is in a state that indicates that it is not currently being used by the user (e.g., only when the display has been off for at least a predetermined time period, such as one minute). Furthermore, if mobile device 130 transitions to a state that indicates that it is currently being used by the user (e.g., the display is turned on) during the scouting process, client application 134 may control second radio system 132B to immediately discontinue the scouting process—e.g., immediately disconnecting from any hotspot that is in the process of being scouted—and return control to the user.

In an embodiment, the application may record the status of each hotspot within the scouting process (e.g., in local database 136). Each record may identify the hotspot (e.g., by service set identifier (SSID) and/or basic SSID (BSSID)) along with its scouting status. For example, when a hotspot has been successfully scouted (e.g., a successful connection has been established and start-up features performed), the application may store a record identifying the hotspot with a status of "SCOUT_COMPLETED." When a hotspot has been recorded as successfully scouted (e.g., identified with a status of "SCOUT_COMPLETED"), the application may avoid scouting it again for that particular mobile device 130. If the scouting process for a hotspot is interrupted (e.g., because a user turns on the display while the hotspot is being scouted), the application may store a record identifying the hotspot with a status of "SCOUT_INTERRUPTED."

In an embodiment, if the scouting process cannot be completed for a hotspot (e.g., second radio system 132B is unable to connect to the hotspot for whatever reason), the application may store a record identifying the hotspot with a status of "SCOUT_FAILED." In addition, the hotspot may be blacklisted (e.g., by adding the SSID of the hotspot to a blacklist, either stored locally in database 136 or remotely in database 116) for a certain time period (e.g., twenty-four hours). This prevents the application from wasting battery power by repeatedly trying to scout the hotspot, but allows a hotspot, which may be undergoing a temporary failure, to be scouted again at a future time.

In an embodiment, server application 114 may instruct client application 134 on how to interact with a captive portal using a captive portal traversal language (CPTL). The CPTL, which may be formatted according to JavaScript Object Notation (JSON), defines specific instructions for traversing a hotspot's captive portal. A CPTL block may carry information for identifying hotspots (e.g., regular expression for SSIDs) for which the instructions, defined in the CPTL block, may be used. A CPTL block may be written and stored in database 116, and passed by server application 114 to each client application 134. When client application encounters a captive portal on a hotspot (e.g., while scouting hotspots), client application 134 may parse the CPTL block associated with that captive portal (e.g., the CPTL block that comprises a regular expression matching the SSID of the hotspot having the captive portal), and execute the instructions in the CPTL block in an attempt to traverse the captive portal.

CPTL blocks may be created to define interactions with Hypertext Markup Language (HTML) and Wireless Internet Service Provider roaming (WISPr). Because a captive portal in HTML may be unique to a particular hotspot, the interactions with HTML can be complex. Thus, the CPTL block for HTML helps client application 134 interact with HTML-based captive portals as if it were a human user, for example, by entering an access code into an HTML field, check an HTML checkbox (e.g., for terms of use), and then activate a button or link in the captive portal. In an embodiment, a default CPTL block is provided to client application 134 and comprises a set of default instructions that can be tried on any arbitrary or HTML-based captive portal. If client application 134 encounters a captive portal which is not associated with a specific CPTL block, client application 134 may attempt to traverse the captive portal using the instructions in the default CPTL block.

In an embodiment, a CPTL block or other message that specifies hotspots (e.g., by SSID) may specify a group or family of hotspots, instead of specifying each hotspot individually. For example, wide area Wi-Fi (WAW) identifies a family of hotspots, which are usually at different locations, using an environmental signature. The environmental signature may comprise a specific SSID (e.g., that is commonly used by each location in a chain of stores providing hotspots), or a pattern (e.g., regular expression) or formula that defines the SSIDs or BSSIDs (e.g., the regular expression "*Starbucks" matches any SSID that ends in "Starbucks", the regular expression "76:A3:*" matches any BSSID that begins with "76:A3").

As used herein, a wide area scout (WAS) is essentially the same as a WAW, and may be implemented in the same manner. However, whereas WAW is used to specify hotspots which a mobile device 130 is to utilize for services (e.g., data communications), a WAS is used to specify hotspots which are to be scouted. Thus, a WAS may comprise a regular expression, such as "*guest*", which matches any SSID that contains the term "guest" (indicating that the SSID identifies a guest network). If the hotspots to be used or scouted are secured (e.g., by Wired Equivalent Privacy (WEP), Wi-Fi Protected Access (WPA), or Extensible Authentication Protocol (EAP)), the WAW or WAS may also comprise a key or other credentials which can be used by the application to automatically connect to the hotspots.

In an embodiment, the application does not scout every visible hotspot. Rather, server application 114 may maintain a list of one or more regular expressions. Client application 134 may control second radio system 132B to perform a scan to identify visible hotspots within the environment, resulting in a list of visible SSIDs. The application may then compare each SSID on the list of visible SSIDs to each of the one or more regular expressions, and only perform the scouting process on hotspots with an SSID that matches at least one of the one or more regular expressions. It should be understood that client application 134 may download the list of regular expression(s) from server application 114 (e.g., in the default CPTL block as a WAS) and perform the regular-expression matching locally. Alternatively, client application 134 could transmit the list of visible SSIDs to server application 114, and server application 114 may perform the regular-expression matching and return the result to client application 134.

In an embodiment, when scouting a hotspot, the application attempts to connect to the Internet via the hotspot (e.g., via access point 124B). When a scout of a hotspot is successful (e.g., the Internet is reached), the scouted hotspot may be saved in local database 136 of mobile device 130. Subsequently, when that hotspot is encountered again in the future, the application may automatically connect to the hotspot (i.e., without user intervention and without having to scout the hotspot again). On the other hand, if the scout for a hotspot is not successful (e.g., a connection with the hotspot is established but the Internet cannot be reached), the application may forget or blacklist the hotspot (temporarily or permanently).

In an embodiment, after the application has used second radio system 132B to scout one or more hotspots, the scouting results are transmitted to server application 114 (e.g., in the form of a diagnostic). The scouting results may comprise a list, which identifies each hotspot (e.g., SSID and/or BSSID of each access point 124B) that was scouted and the scouting result for that hotspot. The scouting result for each hotspot may indicate "attempted" when a connection with the hotspot is established but the captive portal is unable to be traversed (e.g., the instructions in the CPTL block are not successful), "succeeded" when a connection with the hotspot is established and the captive portal is successfully and automatically traversed (e.g., to acquire a connection to the Internet), and "undetected" when a connection with the hotspot is established and no captive portal is encountered (e.g., a connection to the Internet is achieved without having to traverse a captive portal).

The scouting results may be used at server application 114 to curate hotspots, for example, by adding new hotspots to the alternative network access marketplace (e.g., when an Internet connection is automatically acquired through those hotspots) and/or removing hotspots from the alternative network access marketplace (e.g., when an Internet connection cannot be automatically acquired through those hotspots).

For example, if the scouting result for a hotspot is "attempted," this means that the application connected to the hotspot, encountered a captive portal, attempted to traverse the captive portal (e.g., using the default CPTL block), but failed to traverse the captive portal. In this case, the hotspot would not be added to the alternative network access marketplace, but may be used to modify the default CPTL block (or develop another CPTL block) to automatically traverse that hotspot's captive portal in the future. In this manner, the default CPTL block may evolve and improve over time.

As another example, if the scouting result for a hotspot is "succeeded," this means that the application connected to the hotspot, encountered a captive portal, and successfully traversed that captive portal (e.g., using the default CPTL block or another CPTL block associated with the hotspot), for example, to acquire a connection to the Internet. In this case, the hotspot is a good candidate to add to the alternative network access marketplace, such that, for example, other client applications 134 on other mobile devices 130 may utilize the hotspot in the future.

As yet another example, if the scouting result for a hotspot is "undetected," this means that the application connected to the hotspot, did not encounter a captive portal, and, for example, successfully connected to the Internet. In this case, the hotspot is also a good candidate to add to the alternative network access marketplace. However, there is a risk that a captive portal, which the application is unable to automatically traverse, may be encountered in the future.

As a concrete example, the WAS of a CPTL block may be defined as follows:

{"was":{"sid":"(?i).*guest.*|.*Westfield.*|Corner Bakery.*"}}

This example defines a WAS that includes any open hotspot which has an SSID that matches the regular expression "(?i).*guest.*|.*Westfield.*|Corner Bakery.*". Specifically, an SSID will match this regular expression if it contains the term "guest" or "Westfield", or starts with the term "Corner Bakery", irrespective of whether the letters of those terms are uppercase or lowercase (represented by the "i" in the regular expression). The WAS in this example requires that the hotspot be open (i.e., no key required, such as a WPA or WEP key), since it does not include a "key" field. A WAS for secured hotspots would include a "key" field and value in addition to the "sid" field with its regular expression value.

In an embodiment, besides scouting SSIDs that match a WAS, client application 134 may scout any open access point 124B (i.e., no key required) that is visible. In such an embodiment, there may be an exclusion list (e.g., in an "sce" field, described in more detail elsewhere herein). When an exclusion list is specified (e.g., as a regular expression), client application 134 will scout any open access points 124B whose SSIDs do not match the exclusion list. In this manner, the exclusion list can prevent client application 134 from scouting hotspots that are known to not be amenities (e.g., Hewlett Packard™ printers).

Figure 3:
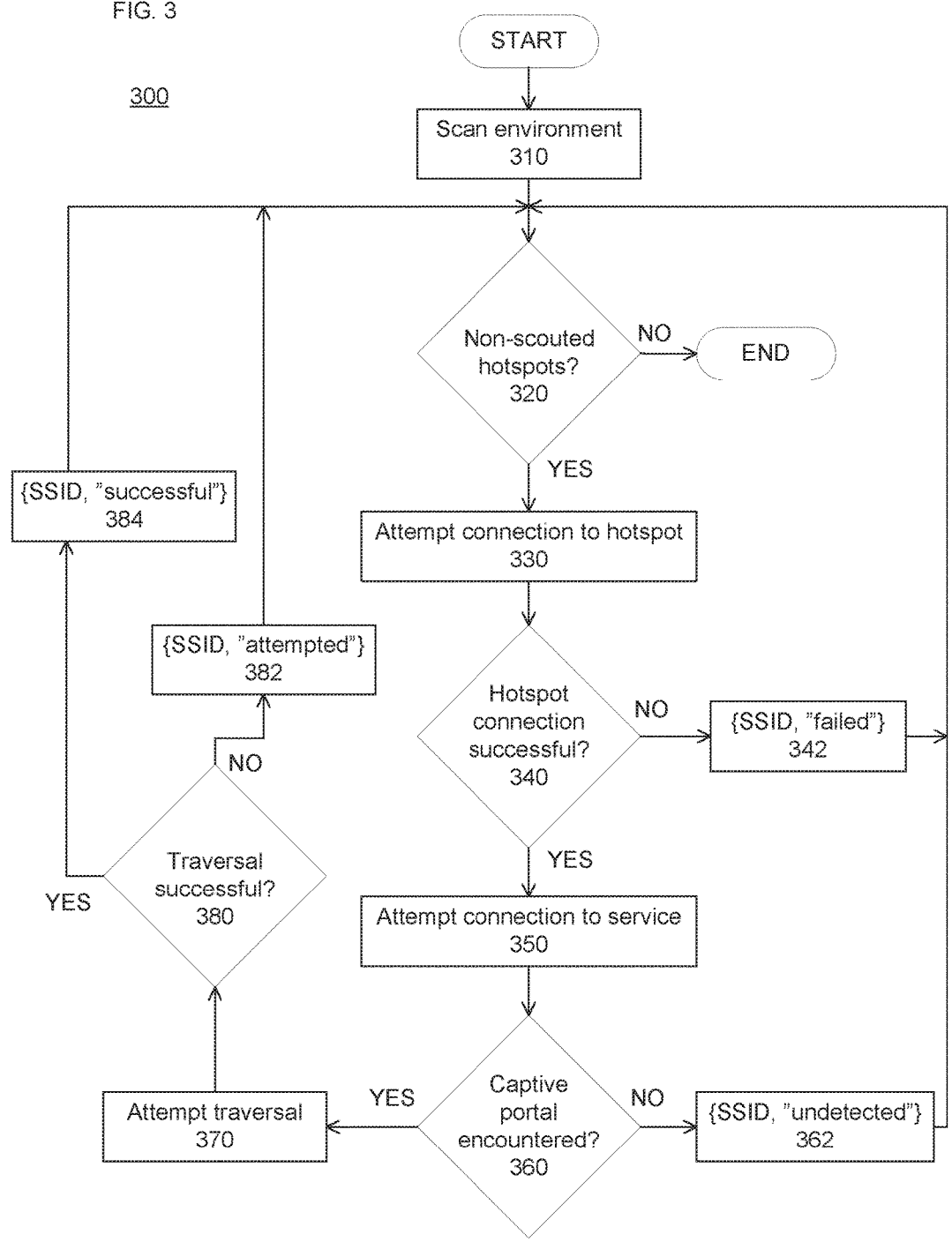
FIG. 3 illustrates a process for scouting hotspots, according to an embodiment.

FIG. 3 illustrates a process 300 for scouting hotspots, according to an embodiment. In an embodiment, process 300 may be performed by client application 134 when mobile device 130 is determined to be inactive. For example, process 300 may be performed only when client application 134 determines that the display of mobile device 130 is off or has been off for at least a predetermined amount of time (e.g., one minute). Furthermore, if the mobile device becomes active during process 300 (e.g., the display is turned on by the user), client application 300 may interrupt and immediately terminate process 300, which may include immediately disconnecting from a hotspot that is being scouted. In this case, a record may be stored in local database 136 indicating that scouting of the hotspot was interrupted (e.g., "{SSID, "interrupted"}). Client application 134 may finish the scouting process for that hotspot when it encounters that hotspot during a future process 300.

In step 310, client application 134 uses a radio system (e.g., second radio system 132B) to perform a scan of the environment to identify visible access points (e.g., Wi-Fi access points 124B). In the remainder of the steps in process 300, client application 134 scouts each identified (and, optionally, non-excluded) hotspot.

In step 320, client application 134 determines whether or not there are any hotspots to be scouted, identified in step 310, that have yet to be scouted. If no hotspots to be scouted remain (i.e., "NO" in step 320), process 300 ends. On the other hand, if at least one hotspot to be scouted remains (i.e., "YES" in step 320), client application selects the next hotspot to be scouted and proceeds to step 330.

In step 330, client application 134 attempts to connect to the hotspot to be scouted that was selected in step 320.

In step 340, client application 134 determines whether or not the connection to the hotspot was successful. If the hotspot connection was not successful (i.e., "NO" in step 340), the hotspot is marked as failed in step 342 (e.g., by recording the SSID of the hotspot in association with a status of "failed" in local database 136), and process 300 returns to step 320. On the other hand, if the connection is successful (i.e., "YES" in step 340), process 300 proceeds to step 350.

In step 350, client application 134 attempts to connect to a service, for example, by attempting to access the Internet (e.g., by pinging or otherwise attempting to communicate with platform 110 or another server over the connection with the hotspot).

In step 360, client application 134 determines whether a captive portal is encountered during the attempt in step 350. If a connection to the service (e.g., Internet) was successful without encountering a captive portal (i.e., "NO" in step 360), the fact that a captive portal was not encountered is indicated with respect to the hotspot in step 362 (e.g., by recording the SSID of the hotspot in association with a status of "undetected" in local database 136), and process 300 returns to step 320. On the other hand, if a captive portal is encountered (i.e., "YES" in step 360), process 300 proceeds to step 370.

In step 370, client application 134 attempts to traverse the captive portal. For example, client application 134 may determine a CPTL block that corresponds to the particular type of captive portal (e.g., HTML, WISPr). If no specific CPTL block corresponds to the particular type of captive portal, client application 134 may use the default CPTL block to attempt to traverse the captive portal.

In step 380, client application 134 determines whether or not the captive portal, encountered in step 350, has been successfully traversed in step 370 (e.g., by pinging or otherwise attempting to communicate with platform 110 or another server over the connection with the hotspot). If the captive portal has not been successfully traversed (i.e., "NO" in step 380), this fact is indicated with respect to the hotspot in step 382 (e.g., by recording the SSID of the hotspot in association with a status of "attempted" in local database 136). On the other hand, if the captive portal has been successfully traversed (i.e., "YES" in step 380), this fact is indicated with respect to the hotspot in step 384 (e.g., by recording the SSID of the hotspot in association with a status of "successful" in local database 136). In both cases, process 300 then returns to step 320.

2.2. Scout Settings

There is a risk posed to mobile device 130 when connecting to arbitrary hotspots, since some hotspots may be malicious. Thus, a user should be fully informed of the risks before the scouting process (e.g., process 300) is used. In an embodiment, the scouting feature of client application 134 may be turned off, such that no automated scouting is performed. A user interface, provided by client application 134 or other software, may provide one or more inputs which enables a user to turn the scouting feature on or off. The first time a user turns the scouting feature on, or every time the user turns the scouting feature on, the user interface may provide a notification that informs the user of the risks.

In an embodiment, server application 114 can control the scouting feature of client application 134, for example, using one or more of the following settings:

"sca": allow deep scouting of open hotspots (e.g., represented by a Boolean with a default value of "true");

"scs": duration for which mobile device 130 must be inactive (e.g., the display turned off) before executing a deep scout (e.g., represented by an amount of time with a default value of sixty seconds);

"scd": duration for which a deep scout should be attempted before being considered a failure (e.g., represented by an amount of time with a default value of ninety seconds);

"sco": include all open hotspots in deep scouting, i.e., not just hotspots with an SSID matching a pattern (e.g., represented by a Boolean with a default value of "false");

"scp": convert successful scouts into local pre-approved hotspots (e.g., represented by a Boolean with a default value of "false");

"sce": regular expression for SSIDs of open hotspots to be excluded from deep scouting (e.g., with a default value of ".*netgear.*|.belkin.*|.linksys.*|.dlink.*|.2wire.* |.asus.*|.cisco.*|.*att[0-9].*|.*mifi.*|.*officejet.* |.*deskjet.*|.*hp.*"); and "scl": length of SSIDs for open hotspots to be excluded from deep scouting, i.e., do not scout a hotspot with an SSID that is longer than this value (e.g., represented by an integer with a default value of six).

An example set of these settings for normal hotspot discovery, which only attempts to scout hotspots that match the WAS in the default CPTL block and waits for the display to be off for a period of sixty seconds before performing the scouting process (e.g., process 300), is as follows:

{"act":"settings","sca":true,"scp":true,"sco":false,"scs": 60}

An example set of these settings for aggressive hotspot discovery, which will scout all open hotspots that are not excluded by the pattern and length settings and will perform the scouting process (e.g., process 300) as soon as the display is turned off, is as follows:

{"act":"settings","sca":true,"scp":true,"sco":true,"scs":0, "sce":"*","scl":6}

An example set of these settings for more aggressive hotspot discovery, which will scout every possible hotspot and will perform the scouting process (e.g., process 300) as soon as the display is turned off, is as follows:

{"act":"settings","sca":true,"scp":true,"sco":true,"scs":0, "sce":" ","scl":0}

In an embodiment, client application 134 stores the list of completed scouts (e.g., the records generated in steps 342, 362, 382, and 384 in process 300), in persistent memory (e.g., in local database 136). Each record in the list of completed scouts may comprise an SSID of the scouted hotspot, a timestamp indicating the time that the hotspot was scouted, and/or the scout result (e.g., "interrupted," "failed," "undetected," "attempted," "successful"). Client application 134 may use the SSID and timestamp in these records to determine whether a future scout should be performed. For example, in one configuration, client application 134 will refrain from scouting the same SSID within a twenty-four hour period (i.e., client application 134 will wait at least twenty-four hours, as determined from the timestamp, before scouting a previously-scouted SSID again). In another configuration, client application 134 will never scout the same SSID twice. In such an embodiment, step 320 in process 300 may comprise comparing the list of SSIDs, identified in step 310, to SSIDs to be excluded, and skipping any SSIDs that match the SSIDs to be excluded.

2.3. Place Name Pairing

In an embodiment, the application may utilize a third-party service (e.g., the API of Google™ Places) to obtain a list of likely locations of mobile device 130. This list may be a list of place names, representing businesses, landmarks, etc., that are associated with the mobile device's location (e.g., including or within a vicinity of GPS coordinates acquired for the mobile device's location). The application may automatically compare the visible SSIDs (e.g., identified during scouting process 300) to the list of likely locations, and pair one or more of the SSIDs with the place names in the list of likely locations. A pairing of SSID and place name indicates that the SSID is likely provided by an operator of the facility (e.g., business) represented by the place name. In this manner, SSIDs encountered by mobile device 130 may be automatically associated with specific businesses and the like.

As an example, a scan of the environment may identify a visible SSID of "_free_2good2be_wifi". In addition, the list of likely locations may include a place name of "2 Good 2 Be Bakery". The application may be able to match this SSID to this place name using pattern matching. As a non-limiting example, this pattern matching may include:

(1) reducing both character strings to lowercase alphanumeric characters (i.e., the SSID becomes "free2good2bewifi" and the place name becomes "2good2bebakery");

(2) if the resulting character strings are six characters or less, searching for the SSID in the place name and the place name in the SSID, such that, if either is found, a match occurs; and, (3) if the resulting character strings are more than six characters, searching for the SSID in the place name, or the place name in the SSID, using a sliding window of five characters, such that if the same five characters occur in both the SSID and place name, a match occurs (e.g, "2good" matches).

Given that the number of SSIDs identified at any given location is likely to be small (e.g., often less than ten due to the limited distance of Wi-Fi™ signals) and the number of possible place names for any given location is also likely small (e.g., often less than ten due to the accuracy provided by GPS), the matching of five characters within the SSID and place names are highly likely to represent a valid pairing.

In an embodiment, when the application identifies a pairing between an SSID and a place name (e.g., business name, landmark name, etc.), the place name may be used to describe the hotspot (e.g., to the user) in the future. In addition, other information associated with the place name (e.g., address, phone number, other contact information, etc.) may be retrieved and also used to describe the hotspot. Server application 114 may perform the pairings, or client application 134 may perform the pairings and, in some embodiments, transmit the pairings to server application 114. It should be understood that these pairings of SSID and place names may be maintained locally on a mobile device 130 in local database 136 and/or maintained by server application 114 in database 116.

In an embodiment, the pairing between an SSID and a place name and/or other information can be used for curation of secured hotspots. For example, if client application 134 encounters a secured hotspot (e.g., hotspot requires credentials to connect, or mobile device 130 can connect to the hotspot but encounters a captive portal that it cannot traverse), the secured hotspot can be classified as a candidate for manual curation. In this case, a curating operator can review the place name and/or other information that has been paired with the SSID for the secured hotspot to determine whether or not and/or how the hotspot should be added to the alternative network access marketplace. For instance, if the place name indicates that the hotspot is operated by a certain business, the curating operator may contact the business (e.g., using the other information paired with the SSID) to enroll the hotspot in the alternative network access marketplace and/or acquire the credentials or other information (e.g., captive portal information) for traversing the hotspot's security mechanism.

2.4. Additions to Local Amenity Supply

As discussed above, scouting (e.g., process 300) may be performed while a mobile device 130 is inactive (e.g., the display is turned off). In an embodiment, client application 134 may have a user-configurable setting (e.g., via a user interface provided by client application 134 or other software) that enables or disables the automated addition of hotspots, that have been successfully scouted during the scouting process, to the mobile device's local hotspot supply. For example, if scouting process 300 identifies a hotspot that provides access to the Internet (e.g., a hotspot identified in steps 362 or 384), this hotspot may be stored in local database 136 in a manner that client application 134 will be permitted to automatically connect to the hotspot (e.g., via second radio system 132B) in the future.

In an embodiment, successfully scouted hotspots are only stored locally in each mobile device 130, such that they are only available to client application 134 of the mobile device that discovered them. Other mobile devices 130 are free to discover these hotspots independently, but the scouted hotspots are not shared across platform 110. Alternatively, scouted hotspots may be communicated by each client application 134 to server application 114, such that the scouting results may be shared across all client applications 134 of all mobile devices 130. As another alternative, scouted hotspots may be communicated by each client application 134 to server application 114, but not shared across all client applications 134. Instead, server application 114 may enable an administrator to utilize the scouted hotspots to curate a whitelist of hotspots for the alternative network access marketplace (e.g., by adding scouted hotspots to the whitelist).

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A method for a mobile device comprising a first radio system and a second radio system, the method comprising using at least one hardware processor of the mobile device to:
determine whether or not the mobile device is inactive; and,
when the mobile device is determined to be inactive, over a time period during which the mobile device is inactive, scouting one or more access points by
scanning an environment of the mobile device using the second radio system to identify one or more access points, and,
for each of the one or more identified access points,
attempting to connect to the access point,
when a connection to the access point cannot be established, setting a scouting status to indicate a failure to establish a connection,
when a connection to the access point is established,
attempting to connect to the Internet via the access point,
determining whether or not a captive portal is encountered while attempting to connect to the Internet via the access point,
when no captive portal is encountered and a connection to the Internet via the access point is established, setting the scouting status to indicate that no captive portal was encountered, and,
when a captive portal is encountered while attempting to connect to the Internet via the access point,
attempting to traverse the captive portal using a set of instructions by
searching for a set of instructions associated with an identifier of the access point,
when the search identifies a set of instructions associated with the identifier of the access point, use the identified set of instructions to traverse the captive portal, and
when the search does not identify a set of instructions associated with the identifier of the access point, use a default set of instructions to traverse the captive portal,
when the captive portal cannot be traversed, setting the scouting status to indicate that the captive portal could not be traversed, and,
when the captive portal is traversed, setting the scouting status to indicate that the captive portal was traversed, and,
recording an identifier of the access point in association with the scouting status.

2. The method of claim 1, wherein identifying one or more access points comprises:
identifying a plurality of access points via the scan; and
including one or more access points from the plurality of access points, based on a setting that identifies a set of access points to include, to obtain the one or more identified access points.

3. The method of claim 2, wherein the setting is a regular expression that matches a plurality of identifiers of access points to be included.

4. The method of claim 3, wherein the plurality of identifiers comprise Service Set Identifiers (SSIDs).

5. The method of claim 1, wherein scouting one or more access points comprises scouting all open, visible access points discovered during the scan.

6. The method of claim 1, wherein identifying one or more access points comprises:
identifying a plurality of access points via the scan; and,
excluding one or more of the plurality of access points from the plurality of access points, based on a setting that identifies a set of access points to exclude, to obtain the one or more identified access points.

7. The method of claim 6, wherein the setting is a regular expression that matches a plurality of identifiers of access points to be excluded.

8. The method of claim 7, wherein the plurality of identifiers comprise Service Set Identifiers (SSIDs).

9. The method of claim 1, further comprising using the at least one hardware processor to, at a future time, after scouting the one or more access points, control the second radio system to automatically connect to at least one of the one or more access points with a scouting status that indicates either that no captive portal was encountered or that the captive portal was traversed.

10. The method of claim 1, further comprising using the at least one hardware processor to, for each of the one or more identified access points, when a captive portal is encountered that cannot be traversed, exclude the access point from future scouting for at least a predetermined amount of time.

11. The method of claim 1, further comprising using the at least one hardware processor to:
while scouting after the mobile device has been determined to be inactive, determine whether or not the mobile device has become active again; and,
when the mobile device is determined to be active again while scouting, responsively, stop scouting, and terminate any connection with the one or more identified access points.

12. The method of claim 1, wherein determining whether or not the mobile device is inactive comprises:
determining that the mobile device is inactive when a display of the mobile device is inactive for at least a predetermined amount of time; and
determining that the mobile device is not inactive when the display of the mobile device has not been inactive for at least the predetermined amount of time.

13. The method of claim 1, further comprising using the at least one hardware processor to transmit a scouting list to a remote server, wherein the scouting list comprises, for each of the one or more identified access points, the recorded identifier of the access point in association with the scouting status for the access point.

14. The method of claim 1, wherein attempting to connect to the Internet via the access point comprises attempting to communicate with a remote service through the access point.

15. The method of claim 1, further comprising:
obtaining a list of place names within a vicinity of a current location of the mobile device; and,
for each of the one or more identified access points,
comparing a service set identifier (SSID) of the access point to the list of place names to attempt to identify at least a portion of a place name that matches at least a portion of the SSID, and,
when at least a portion of a place name that matches at least a portion of the SSID is identified, associating the place name with the SSID.

16. A method for a mobile device comprising a first radio system and a second radio system, the method comprising using at least one hardware processor to:

determine whether or not the mobile device is inactive; and, when the mobile device is determined to be inactive, over a time period during which the mobile device is inactive, scouting one or more access points by scanning an environment of the mobile device using the second radio system to identify one or more access points, and, for each of the one or more identified access points,
attempting to connect to the access point,
when a connection to the access point cannot be established, setting a scouting status to indicate a failure to establish a connection,
when a connection to the access point is established,
attempting to connect to the Internet via the access point,
determining whether or not a captive portal is encountered while attempting to connect to the Internet via the access point,
when no captive portal is encountered and a connection to the Internet via the access point is established, setting the scouting status to indicate that no captive portal was encountered, and,
when a captive portal is encountered while attempting to connect to the Internet via the access point,
attempting to traverse the captive portal using a set of instructions,
when the captive portal cannot be traversed, setting the scouting status to indicate that the captive portal could not be traversed, and,
when the captive portal is traversed, setting the scouting status to indicate that the captive portal was traversed, and,
recording an identifier of the access point in association with the scouting status obtain a list of place names within a vicinity of a current location of the mobile device; and for each of the one or more identified access points,
compare a service set identifier (SSID) of the access point to the list of place names to attempt to identify at least a portion of a place name that matches at least a portion of the SSID, by
normalizing the SSID to a first character string, and,
for each place name in the list of place names,
normalizing the place name to a second character string, and
comparing a sliding window of characters in the first character string to a sliding window of characters in the second character string, and
when at least a portion of a place name that matches at least a portion of the SSID is identified, associating the place name with the SSID.

17. A mobile device comprising:
at least one hardware processor; and
one or more software modules configured to, when executed by the at least one hardware processor,
determine whether or not the mobile device is inactive, and,
when the mobile device is determined to be inactive, over a time period during which the mobile device is inactive, scouting one or more access points by
scanning an environment of the mobile device using the second radio system to identify one or more access points, and,
for each of the one or more identified access points,
attempting to connect to the access point,
when a connection to the access point cannot be established, setting a scouting status to indicate a failure to establish a connection,
when a connection to the access point is established,
attempting to connect to the Internet via the access point,
determining whether or not a captive portal is encountered while attempting to connect to the Internet via the access point,
when no captive portal is encountered and a connection to the Internet via the access point is established, setting the scouting status to indicate that no captive portal was encountered, and,
when a captive portal is encountered while attempting to connect to the Internet via the access point,
attempting to traverse the captive portal using a set of instructions by
searching for a set of instructions associated with an identifier of the access point,
when the search identifies a set of instructions associated with the identifier of the access point, use the identified set of instructions to traverse the captive portal, and,
when the search does not identify a set of instructions associated with the identifier of the access point, use a default set of instructions to traverse the captive portal,
when the captive portal cannot be traversed, setting the scouting status to indicate that the captive portal could not be traversed, and,
when the captive portal is traversed, setting the scouting status to indicate that the captive portal was traversed, and,
recording an identifier of the access point in association with the scouting status.

18. A non-transitory computer-readable medium having instructions stored therein, wherein the instructions, when executed by a processor, cause the processor to:
determine whether or not the mobile device is inactive; and,
when the mobile device is determined to be inactive, over a time period during which the mobile device is inactive, scouting one or more access points by
scanning an environment of the mobile device using the second radio system to identify one or more access points, and,
for each of the one or more identified access points,
attempting to connect to the access point,
when a connection to the access point cannot be established, setting a scouting status to indicate a failure to establish a connection,
when a connection to the access point is established,
attempting to connect to the Internet via the access point,
determining whether or not a captive portal is encountered while attempting to connect to the Internet via the access point,
when no captive portal is encountered and a connection to the Internet via the access point is established, setting the scouting status to indicate that no captive portal was encountered, and, when a captive portal is encountered while attempting to connect to the Internet via the access point, attempting to traverse the captive portal using a set of instructions by searching for a set of instructions associated with an identifier of the access point, when the search identifies a set of instructions associated with the identifier of the access point, use the identified set of instructions to traverse the captive portal, and, when the search does not identify a set of instructions associated with the identifier of the access point, use a default set of instructions to traverse the captive portal, when the captive portal cannot be traversed, setting the scouting status to indicate that the captive portal could not be traversed, and, when the captive portal is traversed, setting the scouting status to indicate that the captive portal was traversed, and, recording an identifier of the access point in association with the scouting status.

\* \* \* \* \*